F. L. RAPSON.
LIFTING JACK.
APPLICATION FILED JULY 10, 1918.
1,343,845. Patented June 15, 1920.
3 SHEETS—SHEET 1.
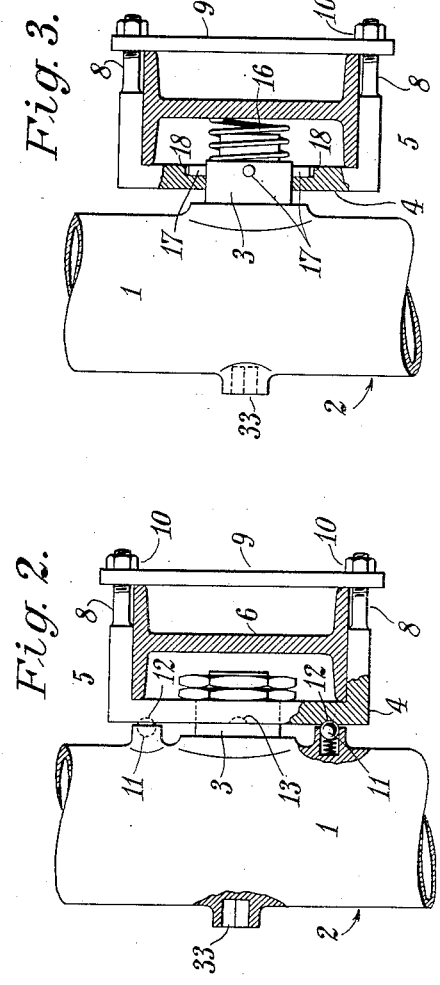
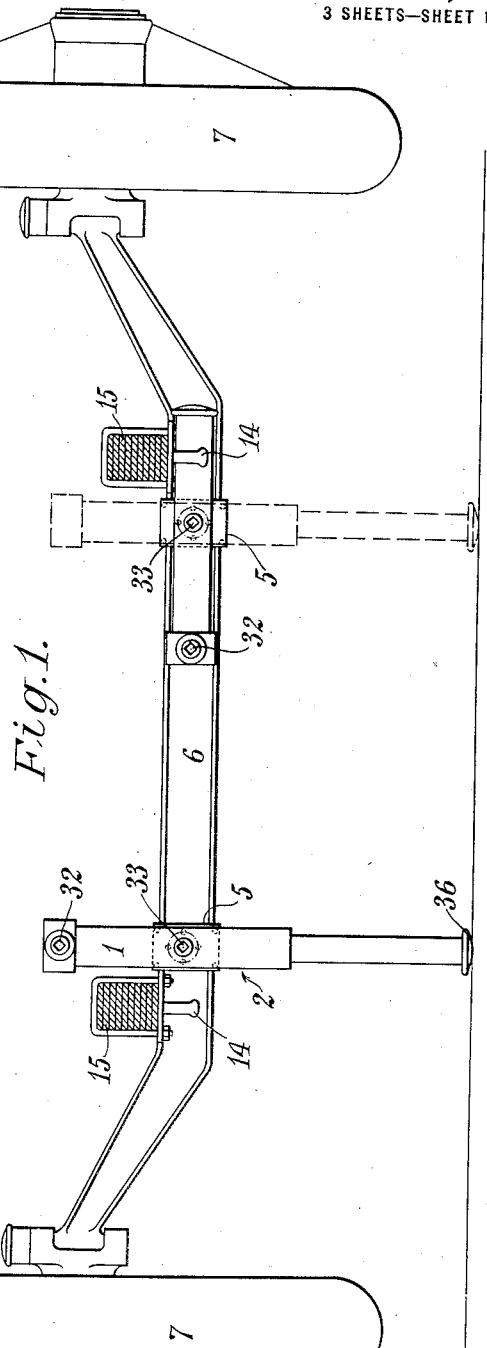
Inventor.
F. L. Rapson

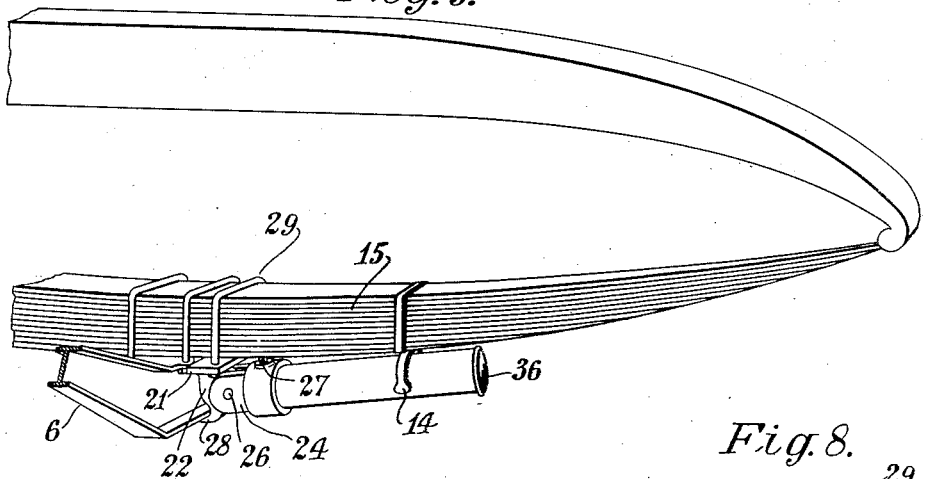
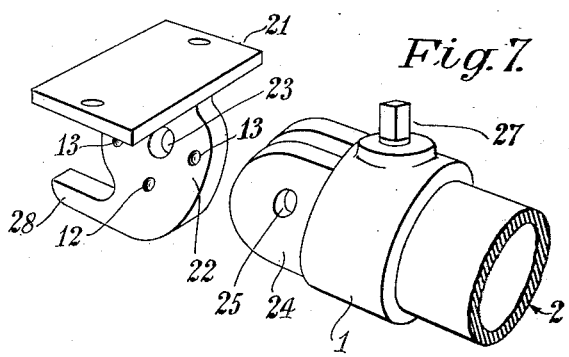
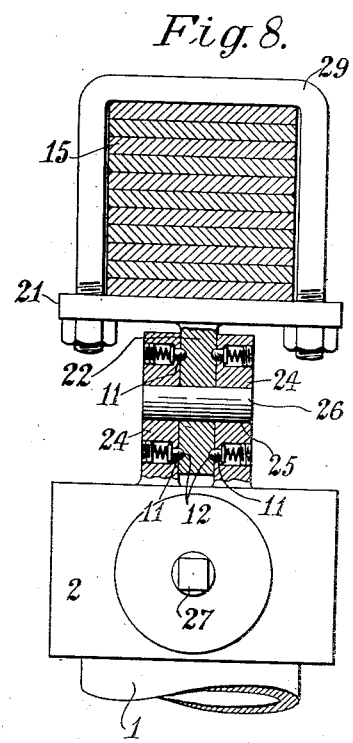
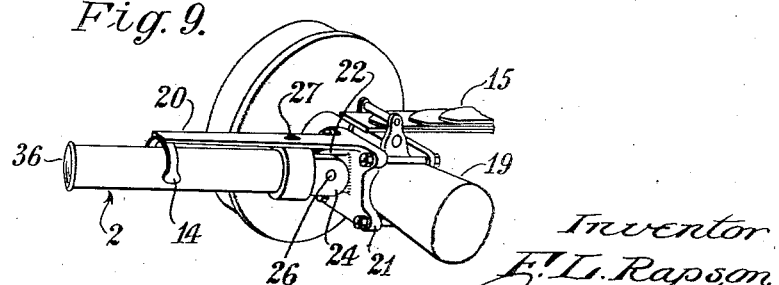

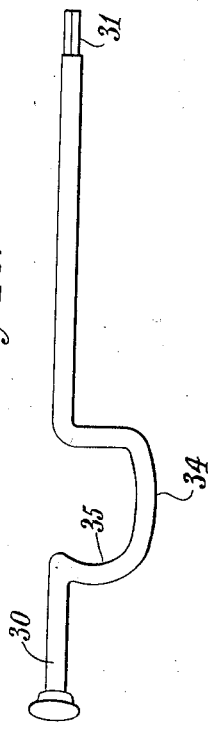
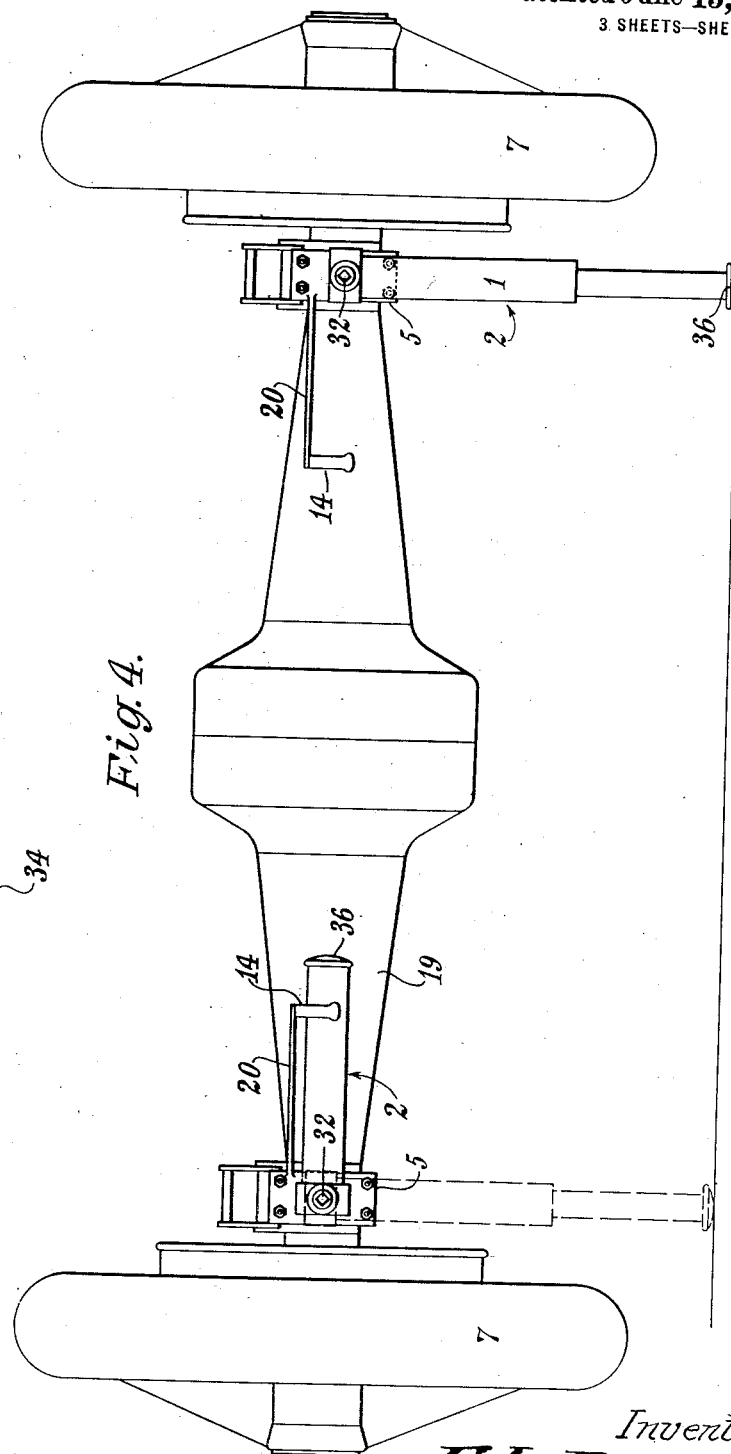

UNITED STATES PATENT OFFICE.

FREDERICK LIONEL RAPSON, OF LIVERPOOL, ENGLAND.

LIFTING-JACK.

1,343,845.

Specification of Letters Patent. Patented June 15, 1920.

Application filed July 10, 1918. Serial No. 244,302.

*To all whom it may concern:*

Be it known that I, FREDERICK LIONEL RAPSON, a subject of His Majesty the King of England, and resident of Liverpool, in the county of Lancaster, Kingdom of England, have invented certain new and useful Improvements in or Relating to Lifting-Jacks, of which the following is a specification.

This invention relates to improvements in lifting jacks and the like for use on motor road and other vehicles.

The invention has for its object to provide on a motor road vehicle such as a motor car and adjacent to one or more of the wheels, a self contained jack element which is so connected, preferably to the axle of the vehicle, that it may be turned or swung from its horizontal or normal position to its vertical and operative position.

A further object is to so swivel or hinge the jack element that it may be turned, when out of use, to a horizontal position either under the ordinary springs of the vehicle or close in to the axle. The jack element may be provided with a swivel connection at the center of the jack or at the extreme end or between these two points. As is well known it is impossible on the majority of cars to permanently and rigidly fit a vertical jack to the axles of the vehicle as it interferes both with road and spring clearance; therefore by connecting the jack to the vehicle through the medium of a swivel the said jack will not impede the movements of the axle and springs or come in contact with the ground, yet a full lift can be obtained when desired.

With these and other objects in view the invention consists in permanently attaching self contained jack elements to the vehicle preferably adjacent to each wheel, and is chiefly distinguished in that each jack element is fitted or connected to a swiveling device which automatically locks the said jack in a substantially horizontal position when not in use or in a vertical position when required to raise the car or an adjacent wheel.

The invention will now be described with reference to the accompanying drawings in which:—

Figure 1 is a view of the front axle of a motor car showing one jack in its operative and the other jack in its inoperative position, the operative position of the latter being shown in dotted lines;

Fig. 2 is a sectional side elevation of one form of swivel attachment;

Fig. 3 is a similar view to Fig. 2 of a modified form of swivel attachment and locking means;

Fig. 4 is a view of the back axle of a motor car showing the jacks in similar positions to those shown in Fig. 1;

Fig. 5 is a perspective view showing a modified form of jack attachment for the front spring or axle;

Fig. 6 is a perspective view of one portion of the device shown in Fig. 5 adapted to be attached to the spring;

Fig. 7 is a view of the jack portion of the attachment shown in Fig. 5;

Fig. 8 is a sectional elevation of the attachment shown in Fig. 5;

Fig. 9 is a perspective view of a modified form of rear axle attachment;

Fig. 10 is a view of one form of brace handle for use with the above jacks.

In one form of this invention as shown more particularly in Figs. 1 and 2 the body 1 of a jack 2 of any suitable type is provided or formed with an outwardly projecting lug or extension 3 which is rotatably mounted in a plate or portion 4 of a device 5 adapted to be secured to the axle 6 of a vehicle, preferably adjacent to each wheel 7. The said device 5, when adapted to fit the front or I-shaped axle 6, is of substantially rectangular shape to engage the top and bottom of the axle 6 and is provided with rearwardly extending screw like extensions 8 adapted to receive a plate 9 engaging the rear side of the said axle; suitable nuts 10 being provided on the screwed extensions 8 to hold the device 5 firmly on the axle 6. To the body 1 of the jack 2 and above and below the projecting lug 3 thereon, about which the jack 2 turns, is provided spring pressed stops, plungers or balls 11 which are adapted to engage in holes or recesses 12 and 13 provided in the front plate 4 of the attachment device 5. Four of these holes or recesses 12 and 13 are preferably provided. The holes or recesses 12 above and below the projecting lug 3 are adapted to receive the pair of spring pressed plungers or balls 11 to hold the jack 2 in its vertical or operative position and the holes or recesses 13 on each side of the extension are adapted to receive the plungers or balls 11, when the jack is turned, to detachably hold or secure the jack in its normal or inoperative position. A suitable V or U shaped spring clip 14 covered with rubber or other suitable material may be provided on the spring 15 of the vehicle to further hold the jack 2 in its inoperative position and prevent rattling during the running of the car. It will be understood that the swivel connection of the jack element 2 may be disposed at any convenient part of the length thereof or at its upper end.

In a modified construction as shown in Fig. 3 the projecting lug or extension 3 on the jack 2 is extended through the plate 4 of the connecting device 5 and is provided with a coil spring or the like 16 to engage one or more pins or stops 17 and press the same into vertical or horizontal recesses 18 formed in the back of the plate 4 of the device 5 to normally hold the jack 2 in either its vertical or its horizontal position. It will be understood that any suitable form of locking devices may be provided to hold the jack 2 in either of its two positions.

When the jack element is secured to the rear axle 19 as shown in Fig. 4 I preferably provide the swiveling connection at the upper end of the jack 2 as this axle 19 is somewhat higher than the front axle 6. Thus an equivalent lift can be obtained on both the front and rear axles 6 and 19 respectively. The spring clip 14 to prevent rattling of the jack may in this instance, be carried off an extension or bracket 20 formed on the swivel attachment device 5.

In a further slightly modified construction as shown in Figs. 5 to 9 the swiveling device may be arranged at right angles to the axles 6 and 19 of the vehicle so that the jack element 2 may be turned up forwardly of the said axle and under, or adjacent to, the springs 15 on the said axles. In this instance the attachment device comprises a plate 21 formed with a circular or disk like extension 22 having a swivel pin hole 23 and the locking holes or recesses 12 and 13 arranged thereon. This disk like extension 22 is adapted to be received between a pair of substantially similar extensions 24 provided on the upper end of the body 1 of the jack 2 and these latter extensions 24 are provided with a corresponding swivel pin hole 25 to receive the swivel pin 26 and with spring pressed balls or plungers 11 to engage in the holes 12 and 13 in the attachment extension 22 to automatically lock the jack 2 in its operative or inoperative position. The jack element 2 may be formed with an outwardly projecting lug or extension 27 to engage against the spring 15 when in its inoperative position and the disk like extension is formed with a lip or lug 28 which is disposed under the axle 6 to engage with upper end of the jack 2 when the said jack is placed in its vertical or operative position. The lug or extension 27 in the above case is shown as the shaped extension of the jack operating means which is adapted to be engaged by the box end of a brace handle to be hereinafter described. The plate 21 of each attachment device is adapted to be secured to the springs 15 or to the axle 6 by U shaped bolts 29 passing around the said springs or axles or by other suitable means. If desired the device may be secured to the springs to the rear or inner side of the axle.

It will be understood that any form of jack element may be used in conjunction with the above described swiveling devices such as hydraulic jacks or anti-friction jacks.

I preferably arrange the above jacks to be operated by a brace handle 30 shown in Fig. 10 through the medium of suitable bevel wheels provided in the casing of the jack element, the square or other shaped end 31 of the handle 30 being inserted in a corresponding hole 32 in the said casing. This handle 30 may also be used to turn the jack elements on their swivels by placing the square or other shaped end 31 thereof in a corresponding hole 33 in the jack body 1 and turning the same. The cranked portion 34 of the brace handle 30 may be formed or provided with a hook or recess 35 to enable the jacks 2 to be easily lifted or lowered without getting under the car.

What I claim is:—

1. The combination with a vehicle part, of a clip for removable clamping connection with such part, a jack pivotally mounted on and with relation to such clip and comprising a body member and a relatively adjustable member, and independent means on the body member and adapted respectively for turning said jack as a whole on its pivotal mounting and for moving the adjusting member relative to the body member.

2. In combination with a fixed part of a vehicle, a lifting jack adapted to be moved to operative and inoperative position, and consisting of an adjustable member and a body member, said body member having a pair of openings to receive an implement for throwing the jack to operative and inoperative positions and for adjusting the jack.

3. In combination with a fixed part of a vehicle, a lifting jack adapted to be moved to operative and inoperative position, and consisting of an adjustable member and a body member, said body member having a pair of openings to receive an implement for throwing the jack to operative and inoperative positions and for adjusting the jack and means for retaining the jack in operative and inoperative positions with reference to said fixed part of the vehicle.

4. In combination with a fixed part of a vehicle, a lifting jack swingingly mounted on said fixed part, and having a pair of openings, and a jack handle adapted to be manually operated to enter either of said openings to adjust and operate said lifting jack.

5. In combination with a lifting jack having a swivel connection with a fixed part of a vehicle, of a manually operated tool for moving the jack to operative and inoperative positions, and for adjusting the jack for service.

In testimony whereof I have hereunto signed my name.

FRED LIONEL RAPSON.